(12) United States Patent
Memmer

(10) Patent No.: US 6,896,753 B2
(45) Date of Patent: May 24, 2005

(54) METHOD OF MAKING A FLUID FILTER, AND FILTER WHICH IS A PRODUCT THEREOF

(75) Inventor: Timothy L. Memmer, Perrysburg, OH (US)

(73) Assignee: Honeywell International, Inc., Morristown, NJ (US)

( * ) Notice: Subject to any disclaimer, the term of this patent is extended or adjusted under 35 U.S.C. 154(b) by 31 days.

(21) Appl. No.: 10/000,567

(22) Filed: Oct. 24, 2001

(65) Prior Publication Data

US 2003/0075497 A1 Apr. 24, 2003

(51) Int. Cl.$^7$ ............................................. B01D 27/08
(52) U.S. Cl. ........................ 156/73.5; 55/497; 210/232; 210/454
(58) Field of Search .................... 210/446, 442, 210/453–455, 497.01, 497.2, 230–232, 451; 55/491, 501–503, 497; 264/DIG. 48; 156/73.1, 73.5

(56) References Cited

U.S. PATENT DOCUMENTS

| | | | |
|---|---|---|---|
| 3,002,870 A | * 10/1961 | Belgarde et al. | ............ 156/70 |
| 3,696,932 A | * 10/1972 | Rosenberg | ............ 210/437 |
| 3,782,083 A | * 1/1974 | Rosenberg | ............ 55/491 |
| 3,872,008 A | * 3/1975 | Lee et al. | ............ 210/232 |
| 3,954,625 A | * 5/1976 | Michalski | ............ 210/445 |
| 4,036,616 A | * 7/1977 | Byrns | ............ 55/498 |
| 4,187,182 A | * 2/1980 | Rosenberg | ............ 210/445 |
| 4,349,363 A | 9/1982 | Patel et al. | |
| 4,414,172 A | 11/1983 | Leason | |
| 4,601,927 A | 7/1986 | Durfee | |
| 4,634,527 A | 1/1987 | Marshall | |
| 4,986,909 A | * 1/1991 | Rai et al. | ............ 210/198.3 |
| 5,049,274 A | 9/1991 | Leason et al. | |
| 5,472,605 A | * 12/1995 | Zuk, Jr. | ............ 210/436 |
| 5,723,047 A | 3/1998 | Turnbull | |
| 6,066,254 A | 5/2000 | Huschke et al. | |
| 6,220,454 B1 | * 4/2001 | Chilton | ............ 210/483 |
| 6,432,307 B2 | * 8/2002 | Gizowski et al. | ............ 210/321.6 |

OTHER PUBLICATIONS

Patent abstract (Machine–translated) of JP 10–166453.*
Derwent abstract of JP 10–166453.*
Hawley's Condensed Chemical Dictionary (Lewis, Richard Sr., 13$^{th}$ ed., John Wiley & Sons, p. 5).*
Machine–Translation of claims of JP 10–166453, 1 page.*
Machine–Translation of Detailed Description of JP 10–166453, 2 pages.*

* cited by examiner

Primary Examiner—Terry K. Cecil

(57) ABSTRACT

A method of assembling a fluid filter begins with a step of aligning housing shells to form a housing. A seam is defined in an area where the housing shells contact one another. The housing shells surround and enclose a porous filter element, having an edge portion that is substantially parallel to an adjacent side wall of the housing. The next step involves heating the first and second housing shells in the area of the seam, such that the first and second end caps are fused together. Another step of the method involves moving molten plastic, from the seam area of the housing, inwardly to contact the filter element, such that the filter element becomes fixed in position in the housing. Preferably, the molten plastic is arranged to form a circumferential seal around the filter element. A filter made according to the method is also described.

25 Claims, 7 Drawing Sheets

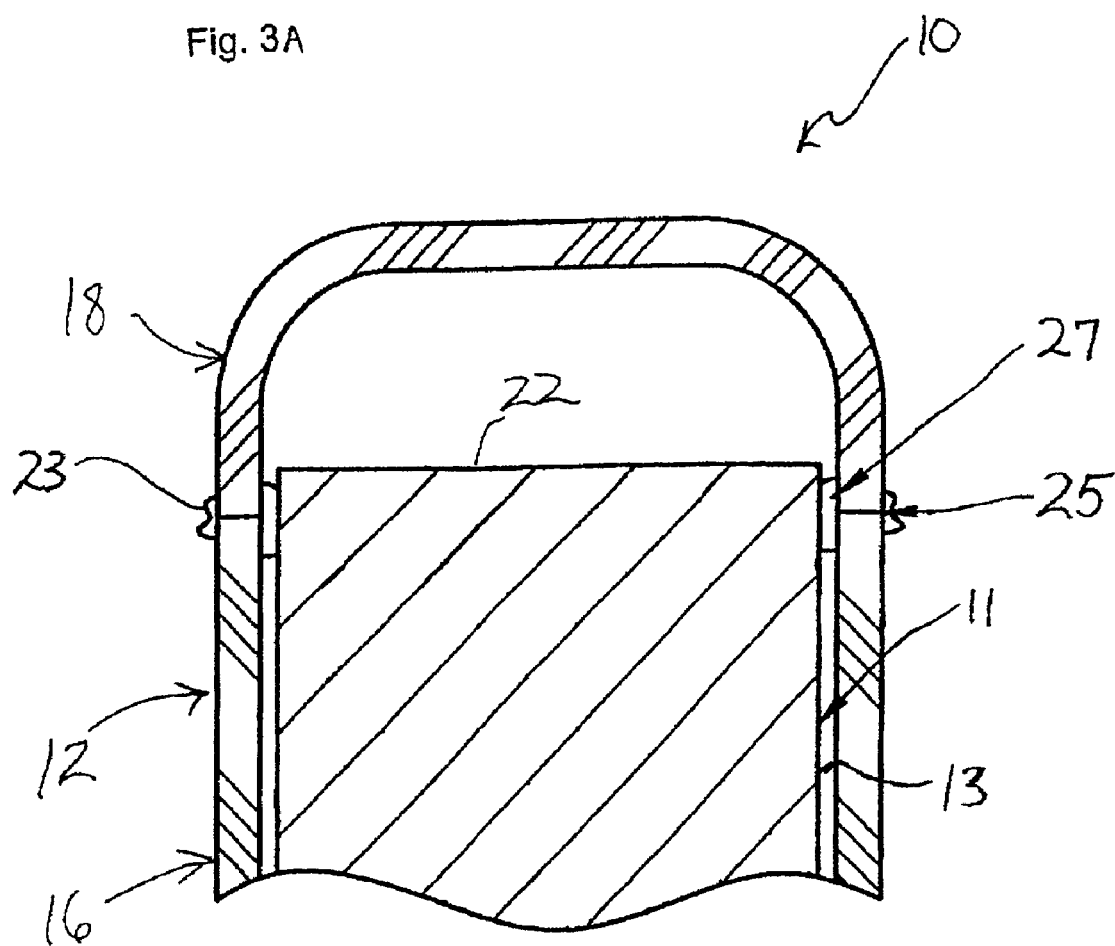

METHOD OF MAKING A FLUID FILTER, AND FILTER WHICH IS A PRODUCT THEREOF

BACKGROUND OF THE INVENTION

1. Field of the Invention

The present invention relates to a method of making a fluid filter, and to a fluid filter which is a product of the described process. More particularly, the present invention relates to a method of attaching a filter housing to a porous filter element adjacent a seam of the housing, without requiring extraneous adhesives, and wherein a molten part of the filter housing adheres to, and forms a seal around the filter element.

2. Description of the Background Art

Fluid filters are commonly used for many applications. Several different types of fluid filter assemblies are known and are commercially available. Vehicles and internal combustion engines use fuel filters, air filters, and oil filters of many different types. Most of the known fluid filters include a filter element made of a porous material. The filter element may include a cylindrical or modified cylindrical tube made of porous material, as a filter medium.

The predominant practice in assembling fluid filters uses an adhesive to affix the filter element to, and to form a fluid-impervious seal around, a wall of the filter housing. The two sections of the housing are then joined together, in an aligned configuration.

In joining plastic parts together, it has generally been preferred to minimize or avoid any migration of molten plastic, sometimes called 'flash', inwardly in the filter housing. One example of a known plastic-welding method, seeking to block flash flow from the edge of the weld joint, is disclosed in U.S. Pat. No. 4,601,927 to Durfee.

Various filter designs have been proposed incorporating a seal formed between a housing and a filter element. Some examples of patents illustrating different types of side or edge seals are described in U.S. Pat. Nos. 4,349,363, 4,414,172, 4,634,527, 5,723,047, and 6,066,254. Further, some limited efforts have been made to use molten plastic material, from the formation of a weld joint between two housing sections, to form a seal around the filter material, such as the method disclosed in U.S. Pat. No. 5,049,274.

While the known filter designs are useful for their specified functions, a need still exists in the filtration art for an improved method of assembling a fluid filter, which securely affixes a tubular filter element to a filter housing, and which may be performed without requiring a specialized adhesive.

SUMMARY OF THE INVENTION

The present invention provides a method of making a fluid filter, and a fluid filter which is a product of the described method.

The method according to the invention involves an early step of aligning first and second plastic housing shells in contact with one another and surrounding a porous filter element, to form a housing. A seam is defined where the edges of the housing shells contact one another.

The method according to the invention also involves a step of heating the first and second housing shells in the area of the seam, in a manner such that the first and second housing shells are fused together to form the housing.

The method, according to the invention, also includes a step of moving molten plastic material from the seam area of the housing inwardly to contact a side surface of the filter element, such that the filter element becomes fixed in position in the housing.

Preferably, in this material moving step, a fluid-resistant seal is formed between the housing and the filter element.

As noted, the present invention also encompasses a fluid filter, which is a product of the preferred method.

A fluid filter according to the invention includes a hollow housing, formed from first and second plastic housing shells contacting one another, in either nesting relation or in substantially edge-to-edge relation. A seam is defined where the first and second housing shells contact one another.

The housing shells cooperate to define the housing, which is provided to substantially surround and enclose a filter element.

The housing is formed of a thermoplastic material. Preferably, the housing is formed from a material selected from the group comprising polyamides, polyacetals, polyimides, polyesters, polyolefins, polysulfones, fluoropolymers, and mixtures thereof. Polyacetal resins and nylon-6 are particularly preferred materials for the housing.

A fluid filter according to the invention also includes a filter element disposed in the housing. The filter element may be substantially cylindrical in shape, or may be a modified cylinder. The filter element is formed out of porous material, which may be sintered or be otherwise porous to a filtrate. The filter element includes a side edge portion that is oriented substantially parallel to an adjacent side wall of the housing.

An important feature of a fluid filter according to the invention is that a certain amount of plastic material, from the seam area of the housing, extends inwardly to contact the filter element, such that the filter element is fixed in position in the housing.

Preferably, in the fluid filter hereof, plastic material from the area of the housing seam forms a fluid-resistant seal extending circumferentially in a band around the filter element.

Optionally, if desired, one or both of the first and second plastic housing shells may be thickened, in the seam area thereof, in order to provide extra material for forming a seal around the filter element.

Accordingly, it is an object of the present invention to provide a method of making a fluid filter, which does not require a separate adhesive to seal around the filter element, other than the material of the filter housing.

It is a further object of the present invention to provide a fluid filter which is a product of the described method.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 3A is a simplified cut-away detail view of the filter of FIG. 3.

DETAILED DESCRIPTION OF THE PREFERRED EMBODIMENTS

Overview

The present invention provides a method of assembling a fluid filter, and also provides a filter which is a product of the described method.

Figure 1:
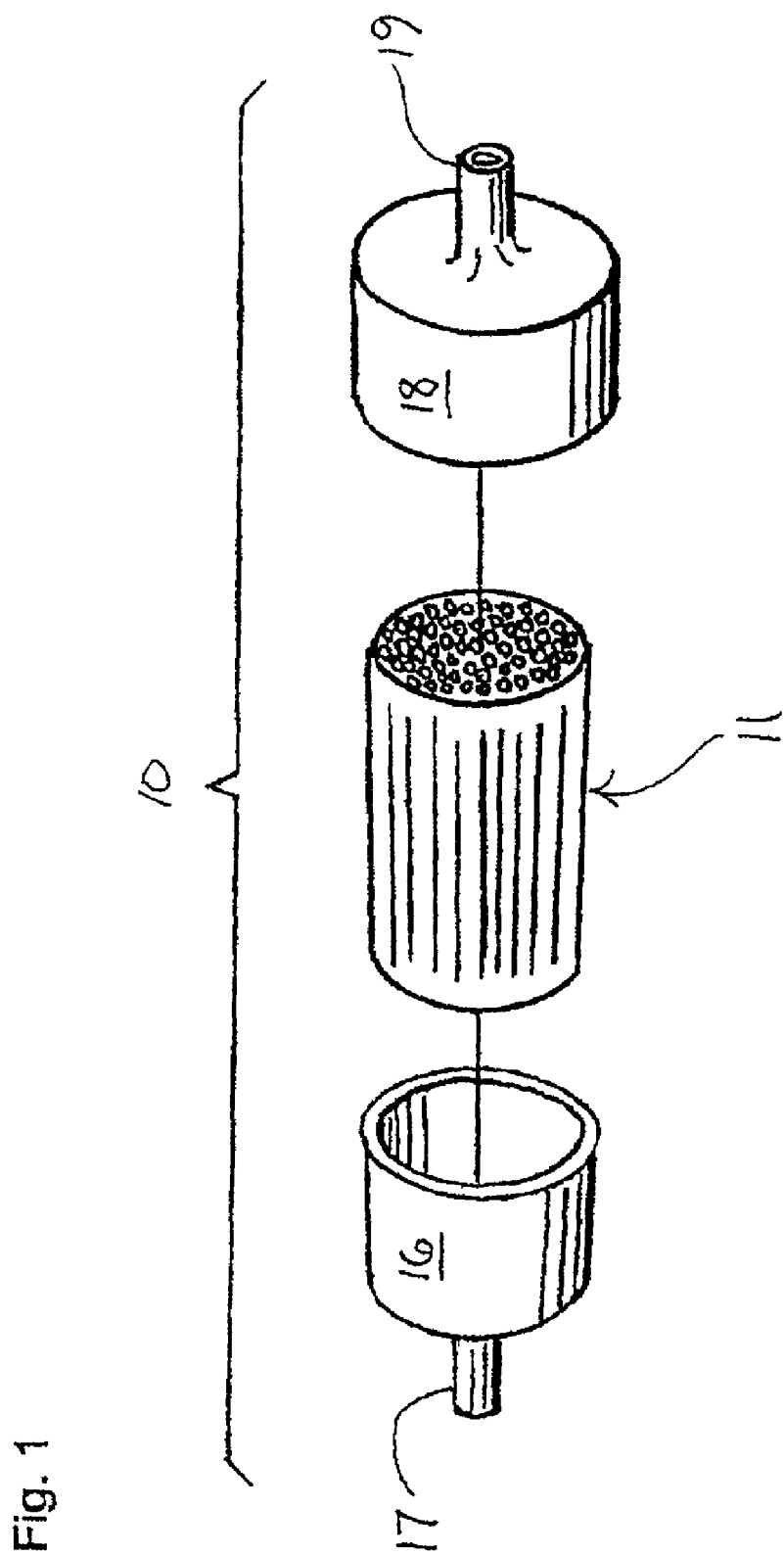
FIG. 1 is an exploded perspective view of a fuel filter in accordance with a first preferred embodiment of the present invention.

An exploded perspective view of a fluid filter 10 in accordance with a first embodiment of the invention is shown in FIG. 1.

The filter 10 is appropriate for use as a fuel filter in the illustrated embodiment. The filter 10 includes a hollow plastic housing 12 (FIG. 3), and a porous filter element 11 disposed within the housing. The filter element 11 may be extruded plastic, or may be made otherwise porous. It is preferred that the filtrate pass through the filter element 11 in a direction which is substantially linear and parallel to the longitudinal axis thereof, although some of the filtrate entering through the sides of the filter element is acceptable.

The housing 12 includes first and second housing shells 16, 18 which cooperate to substantially surround and enclose the filter element 11. The first housing shell 16 is provided with a hollow inlet tube 17 in fluid communication with the interior thereof, and the second housing shell 18 is provided with a hollow outlet tube 19 in fluid communication with the interior thereof. The first and second housing shells 16, 18 are alignable in edge-to-edge relation to form the housing 12.

The Method

Figure 4:
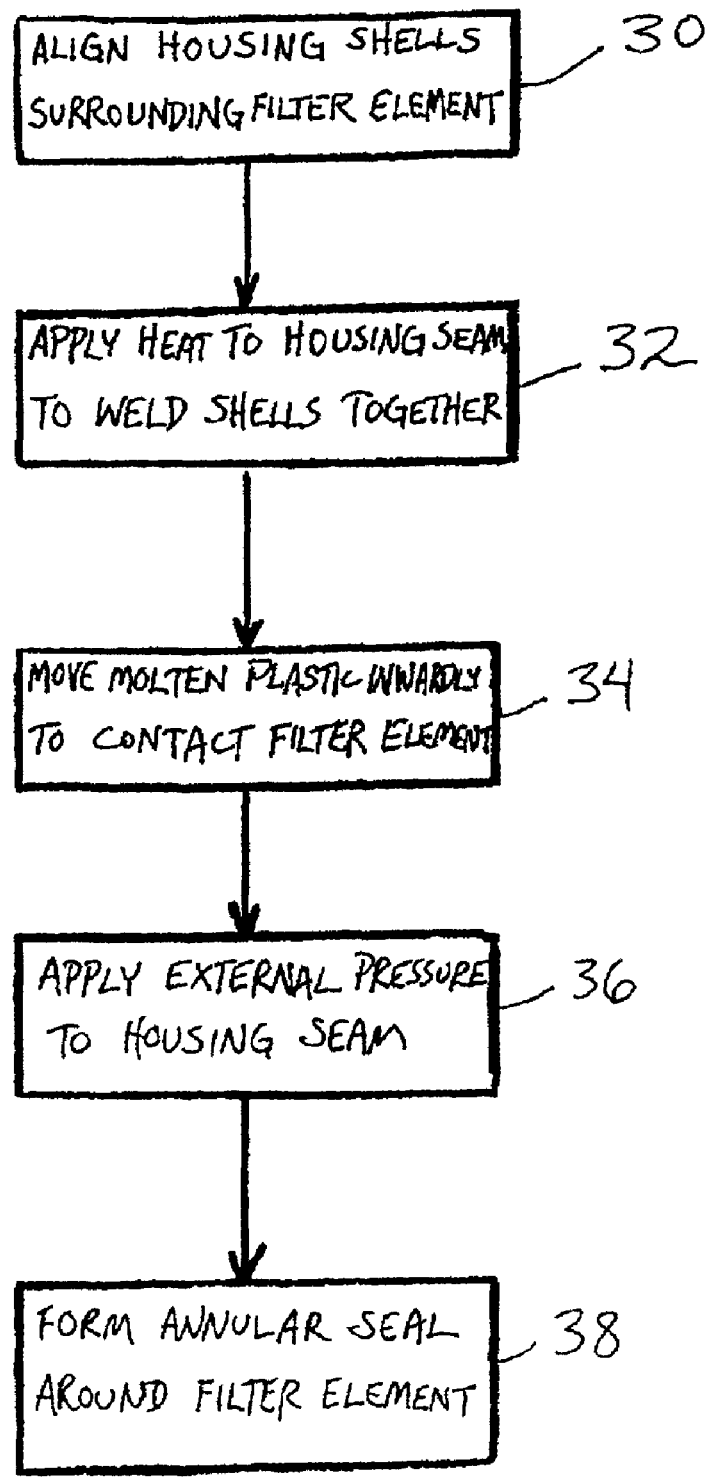
FIG. 4 is a block diagram showing a sequence of steps in a preferred method according to the present invention.

The method according to the invention involves a step of aligning first and second plastic housing shells 16, 18, either in nesting relation or in substantially in edge-to-edge contact with one another, to form the housing 12, which substantially surrounds and encloses the filter element 11. This alignment step is shown at 30 in FIG. 4.

Figure 2:
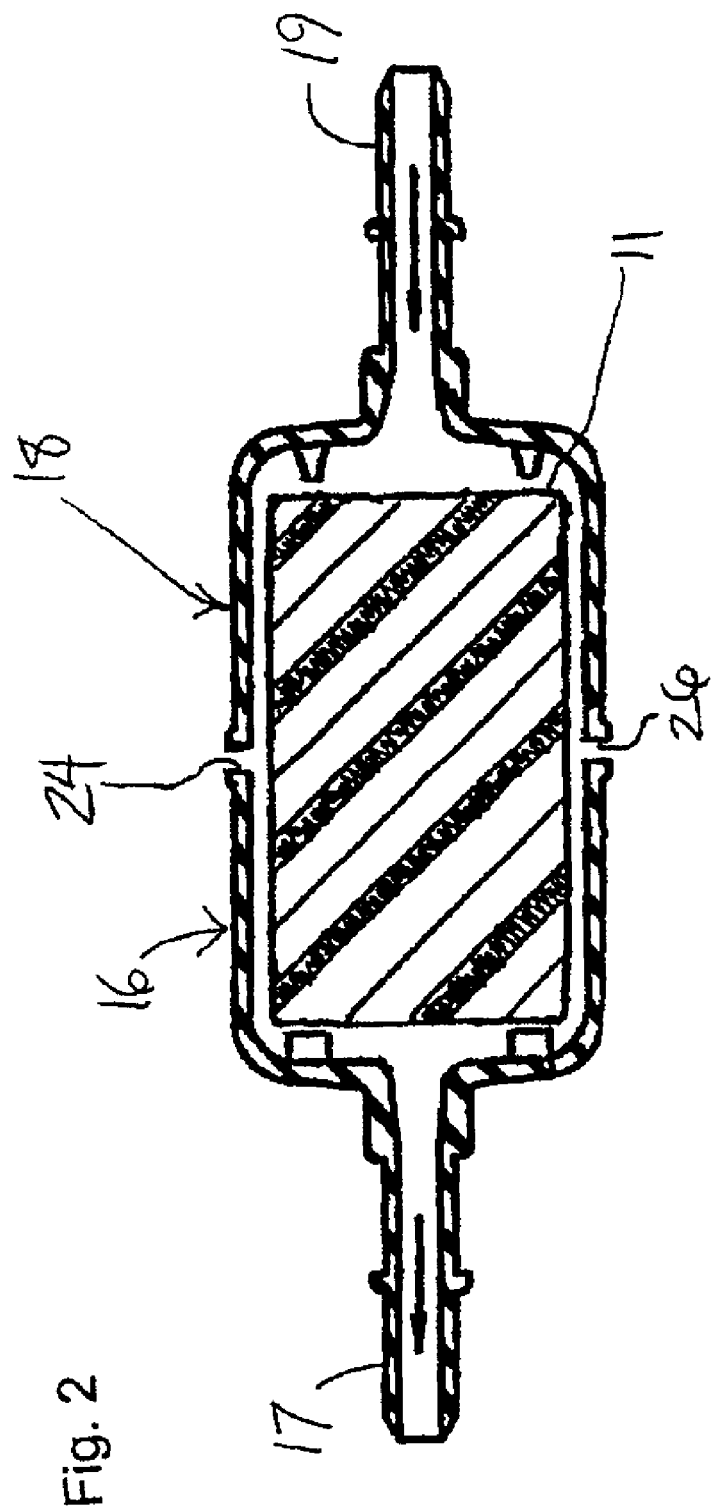
FIG. 2 is a cross-sectional view of the fuel filter of FIG. 1, with the housing sections shown spaced away from one another.
Figure 3:
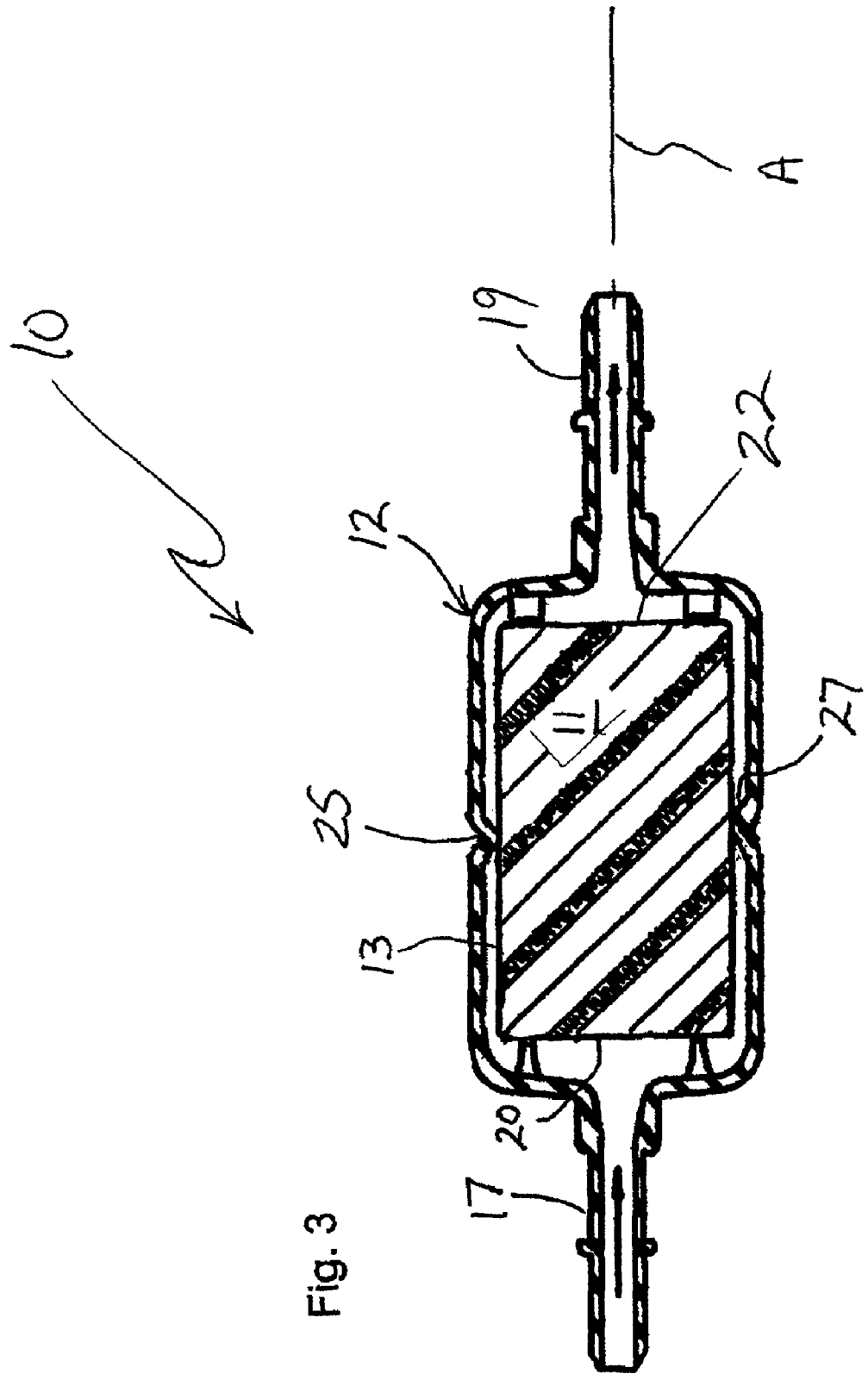
FIG. 3 is a cross-sectional view of the fuel filter of FIGS. 1–2, shown in an assembled configuration, with a welded seam according to the invention.

Referring now to FIGS. 2, 3 and 3A, it will be seen that a seam 25 is defined in an area where the respective abutting edges 24, 26 of the first and second housing shells 16, 18 contact one another. The housing shells 16, 18 cooperate to define the housing 12, having a central longitudinal axis A.

The method according to the invention also involves a step of heating the first and second housing shells 16, 18 in the area of the seam 25, such that the housing shells are partially melted and fused together to form the housing 12. The heat forms a weld joint 23 at the seam 25. The heating step may involve the use of a friction welding process, may involve sonic or laser welding, or may involve the application of infrared radiation to the seam. This heating step is shown at 32 in FIG. 4.

In the past, it has been preferred to minimize the amount of overflow or 'flash' from plastic welding processes, as outlined in U.S. Pat. No. 4,601,927.

However, it has now been realized that a controlled amount of flash from the welding process may be benefi-cially created and used to fix the position of the filter element 11 in the housing 12. In particular, it has been discovered that a controlled amount of flash may be generated and used to form a circumferential seal 27 in an annular band around the filter element 11, and between the filter element and housing 12. The seal 27 is formed between the seam area 25 of the housing and a side edge 13 of the filter element 11.

The method according to the invention also includes a step of moving molten plastic material inwardly towards the longitudinal axis A, from the seam area 25 of the housing 12, to contact the filter element 11, such that the filter element becomes fixed in position in the housing. This plastic moving step is shown at 34 in FIG. 4.

Optionally, external pressure may be applied to the molten housing seam to compress it inwardly against the filter element. This optional step is shown at 36 in FIG. 4.

Preferably, in the plastic moving step of the method, plastic material from the housing 12 is affixed to the filter element 11, in a circumferential annular band therearound, to form a fluid-resistant seal 27 between the housing and filter element. This seal-forming step is shown at 38 in FIG. 4.

The Filter Apparatus

The present invention also encompasses a fluid filter which is a product of the method hereof.

As shown in FIGS. 1 through 3A, a fluid filter 10 according to the invention includes a hollow housing 12, formed from the first and second plastic housing shells 16, 18 contacting one another along edge portions 24, 26 thereof, either in nesting or in substantially edge-to-edge relation.

The housing shells 16, 18 cooperate to define the housing 12, which is provided to substantially surround and enclose a filter element.

Although the housing shells 16, 18 are shown in the drawings as being substantially the same length as one another, they may be made of different lengths from one another, as desired for a particular application. For example, and as illustrated in FIG. 3A, the first housing shell 16 may be made to extend most of the length of the filter element 11, and the second housing shell 18 may be made correspondingly shorter. Changing the relative lengths of the shells 16, 18 will effectively move the location of the seam 25 on the housing, and will also move the location of the seal 27.

The housing 12 is formed of a thermoplastic material. Preferably, the housing 12 is formed from a material selected from the group comprising polyamides, polyacetals, polyimides, polyesters, polyolefins, polysulfones, fluoropolymers, and mixtures thereof. Polyacetal resins and Nylon 6 are particularly preferred materials for the housing. The material used to form the filter element 11 as well as the housing 12 are selected for their stability in the fluid environment for which they are intended.

The fluid filter 10 also includes a porous filter element 11 that fits inside, and is surrounded by the housing 12. The filter element 11 includes a side edge portion 13 that is substantially parallel to an adjacent side wall of the housing 12.

The filter element 11 is preferably provided as a porous, cylindrical filter element, which may be formed in the general shape of cylinder or a modified cylinder. The filter element may be extruded, may be formed from sintered plastic beads having hollow spaces defined therebetween, or may be formed from other filter material known in the art. The present invention is disfavored for use with a filter element made of pleated filter paper, as it is not believed to be suitable for forming a seal with such material.

With reference to FIG. 3A, one illustrative example of a possible flow path of the fluid filtrate begins when the filtrate enters the housing inlet 17. The fluid filtrate may then flow into a first porous end wall 20 of the filter element 11, where some impurities are removed. Some of the fluid filtrate may also flow around the filter element 11 and in through a side wall 13 thereof. However, the filtrate is blocked from bypassing the filter element by the seal 27 formed between the housing 12 and the filter element 11. The fluid filtrate passes in a substantially axial direction through the porous filter element, and then passes outwardly from a second end wall 22 adjacent the filter outlet 19, and then exits the filter 10 via the outlet. Other filter designs may have different flow paths from the example described here. The flow path is not a critical feature of the present invention.

An important feature of a fluid filter according to the invention is that plastic material from the seam area 25 of the housing 12 extends inwardly to contact the filter element 11, such that the filter element is fixed in position in the housing.

Preferably, in the fluid filter 10 hereof, plastic material from the area of the housing seam 25 forms a seal 27 extending circumferentially in a relatively thin band around the filter element. Preferably, the seal forms a band having a width in a range of 1 mm–5 mm.

Optionally, if desired, one or both of the first and second plastic housing shells may be thickened in the seam area thereof, in order to provide extra material for forming the seal around the filter element.

Figure 5:
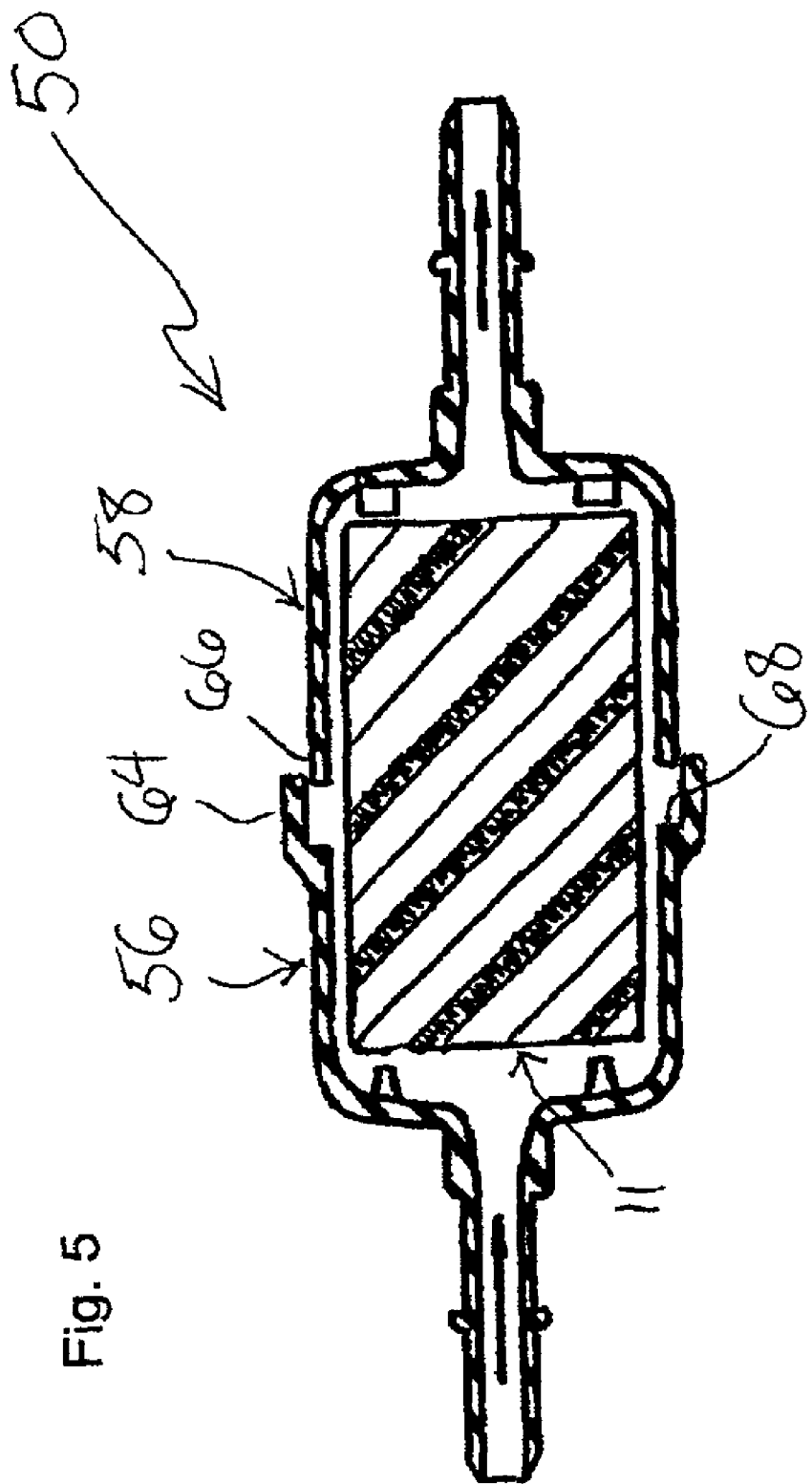
FIG. 5 is a cross-sectional view of a fuel filter according to a second embodiment of the invention, with the housing sections shown spaced away from one another.

A fuel filter in accordance with a second embodiment of the invention is shown at 50 in FIG. 5. The fluid filter 110 of FIG. 5 is substantially identical to the filter 10 as previously described herein, with the exception that in this second embodiment, the two shells 56, 58 of the housing fit together in nesting relation instead of edge-to-edge relation. The first shell 56 includes a flange 64 having a widened diameter at the edge thereof, and the second shell 58 includes an edge portion 66 that fits slidably inside of the flange 64 until it seats against an interior shelf 68 formed inside the first shell. This overlapping of the flange 64 with the edge portion 66 provides extra material for forming the seal 27 around the filter element 11 in the finished filter.

Figure 6:
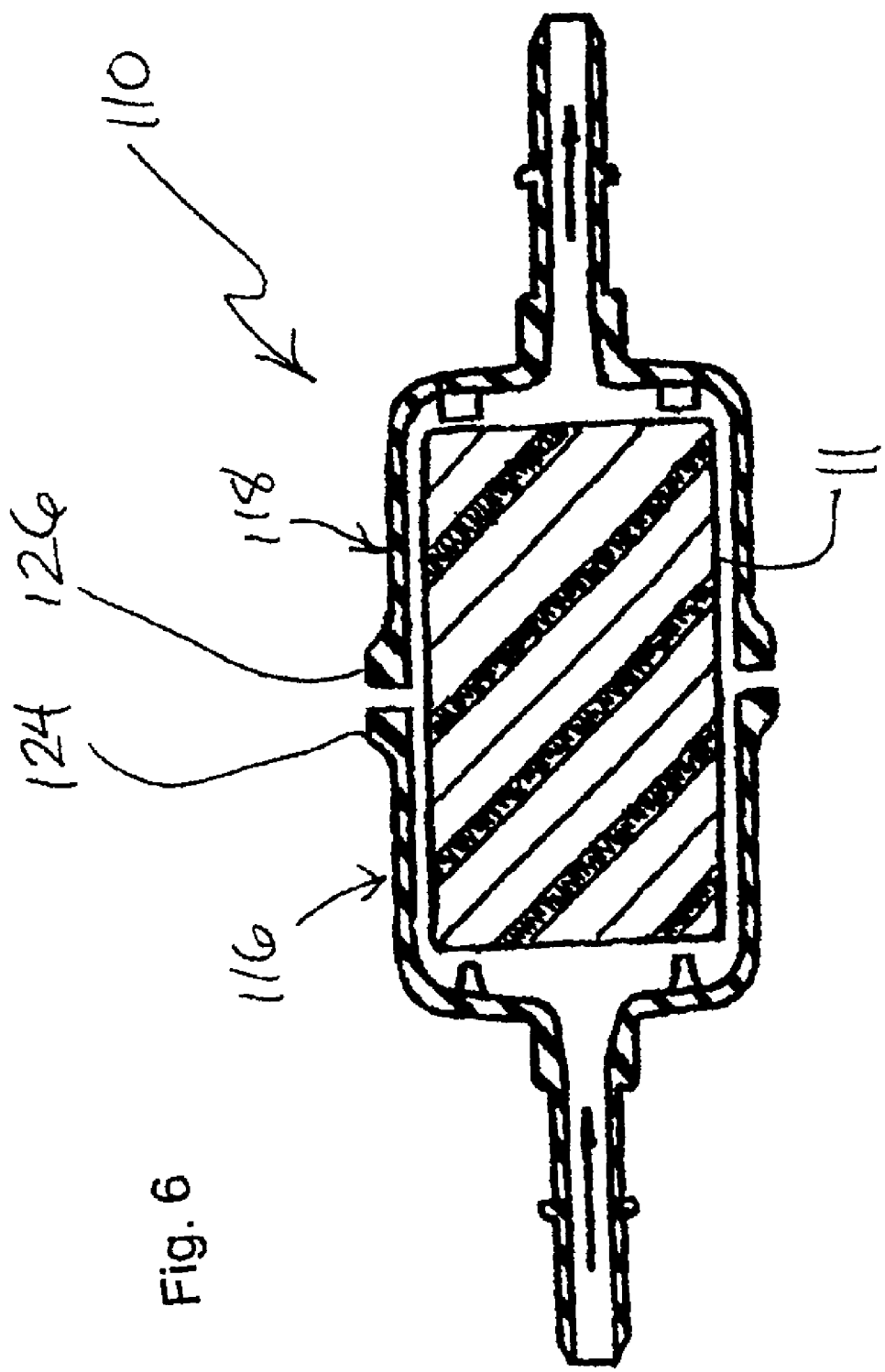
FIG. 6 is a cross-sectional view of a fuel filter according to a third embodiment of the invention, with the housing sections shown spaced away from one another.

A fluid filter 110 according to a third embodiment of the present invention is shown in FIG. 6. The fluid filter 110 of FIG. 6 is substantially identical to the filter 10 as previously described herein, with the exception that in this modified embodiment, each of the respective housing shells 116, 118, includes a thickened rim portion 124, 126, in order to provide extra material to form a seal 27 around the filter element 11.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

What is claimed is:

1. A method of making a fluid filter, comprising the steps of:
   aligning first and second plastic housing shells in contact with one another to form a housing having a central axis, said first and second plastic housing shells each having an end portion and outer wall depending from said end portion to define a portion of an internal cavity wherein a seam area is defined in an area where the first and second housing shells contact one another,
   said outer walls of said housing shells substantially surrounding and enclosing a filter element without contacting the filter element;
   heating said outer walls of the first and second housing shells proximate the seam, such that the first and second housing shells are fused together to form a housing; and
   moving molten plastic material from the seam area, inwardly to contact the filter element, such that the filter element becomes fixed in position in the housing by molten plastic material from the seam area.

2. The method of claim 1, wherein an infrared heat source is used during the heating step.

3. The method of claim 1, further comprising a step of applying external force to a selected portion of the housing, after the heating step, to compress the selected portion of the housing inwardly.

4. The method of claim 1, wherein a circumferential seal is formed around the filter element as a result of said plastic moving step.

5. A fluid filter which is a product of the method of claim 4.

6. The method of claim 1, wherein the filter element and the seam area of the housing shells are cylindrical in shape and said plastic moving step forms an annular band of plastic extending between the filter element and the seam area of the housing shells.

7. The method of claim 6, wherein said annular band has a width in a range of 1 mm–5 mm.

8. The method of claim 1, wherein the housing is formed of a thermoplastic material from the group consisting of polyacetals, polyamides, polyimides, polyesters, polyolefins, polysulfones, fluoropolymers, and mixtures thereof.

9. The method of claim 1, wherein a portion of the filter element becomes at least partially embedded in plastic material from the housing, as a result of said plastic moving step.

10. The method of claim 1, wherein at least one of the first and second plastic housing shells is thickened in the seam area thereof, compared to the rest of the housing.

11. A fluid filter which is a product of the method of claim 1.

12. A fluid filter, comprising:
   a hollow housing having an inlet, an outlet, a central axis, and a cylindrically-shaped side wall extending circumferentially about said central axis at a first radial distance said housing comprising first and second plastic housing shells contacting one another, wherein a circumferential seam area is formed in an area of the side wall where the first and second housing shells contact one another;
   a porous filter element disposed in the housing, the filter element including two opposed end walls and a cylindrically-shaped side wall portion extending circumferentially about said central axis, said cylindrically-shaped side wall of said porous filter element having a second radial distance which is less than said first radial distance, and interconnecting the end walls;
   wherein plastic from the seam area of the housing extends inwardly from the seam area of the housing to contact the cylindrically-shaped side wall portion of the filter element, such that the filter element is fixed in relation to the housing by the plastic of said circumferential seam.

13. The filter of claim 12, wherein plastic from the housing forms a substantially circumferential seal extending around the filter element.

14. The filter of claim 13, wherein the seal is located between the inlet and the outlet of the housing.

15. The filter of claim 12, wherein the housing is formed of a thermoplastic material selected from the group consisting of polyamides, polyimides, polyesters, polyolefins, polysulfones, fluoropolymers, and mixtures thereof.

16. The filter of claim 12, wherein the plastic from the seam area forms an annular band surrounding the filter element, extending between the filter element and the seam area of the housing.

17. The filter of claim 16, wherein said annular band has a width in the range of 1 mm–5 mm.

18. The filter of claim 12, wherein at least one of the first and second plastic housing shells is thickened in the seam area thereof, compared to the rest of the housing.

19. The filter of claim 18, wherein the seal is closer to the outlet than the inlet.

20. A fluid filter, comprising:
a plastic housing shell comprising a first shell portion and a second shell portion, said first shell portion having an end portion with a first fluid conduit disposed therein and a circumferential wall depending away from said end portion, said second shell portion having an end portion with a second fluid conduit disposed therein and a circumferential wall depending away from said end portion, wherein said first shell portion and said second shell portion define an internal receiving area when said circumferential walls of said plastic housing shell are aligned with each other, said internal receiving area having a length defined by the distance between the ends of said first shell portion and said second shell portion and a width defined by said circumferential walls, wherein a circumferential seam area is formed where said circumferential walls contact one another;
a porous filter element disposed in said internal receiving area, said filter element including two opposed end walls and a side wall portion extending between said two opposed end walls, said side wall portion of said porous filter element having an external dimension less than said width of said internal receiving area;
wherein plastic from said circumferential seam area extends inwardly into said internal receiving area to contact said side wall portion of said filter element, such that said filter element is fixed in relation to said plastic housing shell by plastic of said circumferential seam.

21. The fluid filter as in claim 20, wherein said plastic from said circumferential seam area only extends inwardly into said internal receiving area when said first shell portion and said second shell portion are heated to form said circumferential seam.

22. The fluid filter as in claim 20, wherein said circumferential walls are circular in shape and said porous filter element is cylindrical in shape such that said width is defined by an inside diameter of said circumferential walls and said external dimension of said porous filter element is defined by an external diameter being less than said inside diameter.

23. The fluid filter as in claim 22, wherein said plastic from said circumferential seam area only extends inwardly into said internal receiving area when said first shell portion and said second shell portion are heated to form said circumferential seam.

24. The fluid filter as in claim 22, wherein said first fluid conduit is aligned with said second fluid conduit when said circumferential walls of said plastic housing shell are aligned with each other.

25. The fluid filter as in claim 20, wherein said end walls of said first shell portion and said second shell portion each comprise at least one protrusion for making contact with said end wall of said porous filter element.

* * * * *